(12) United States Patent
Lang et al.

(10) Patent No.: US 6,642,840 B2
(45) Date of Patent: Nov. 4, 2003

(54) REARVIEW MIRROR ASSEMBLY WITH MONITOR

(75) Inventors: Heinrich Lang, Ergersheim (DE); Michael Witzke, Ansbach (DE)

(73) Assignee: Lang-Mekra North Amicica, LLC, Ridgeway, SC (US)

( * ) Notice: Subject to any disclaimer, the term of this patent is extended or adjusted under 35 U.S.C. 154(b) by 0 days.

(21) Appl. No.: 09/810,942

(22) Filed: Mar. 16, 2001

(65) Prior Publication Data

US 2002/0011927 A1 Jan. 31, 2002

(30) Foreign Application Priority Data

Jul. 28, 2000 (DE) .......................... 100 36 875
Nov. 28, 2000 (DE) .......................... 200 20 166

(51) Int. Cl.$^7$ .............................. B60Q 1/00; G02B 5/26
(52) U.S. Cl. .................... 340/435; 340/425.5; 359/839; 348/148; 348/151; 362/494
(58) Field of Search .............................. 340/435, 425.5; 362/494; 359/838, 839, 871, 843; 348/143, 148, 151

(56) References Cited

U.S. PATENT DOCUMENTS

| 809,698 A | 1/1906 | Kelley |
|---|---|---|
| 1,528,082 A | 3/1925 | Schlaich |
| 1,849,708 A | 3/1932 | Colbert et al. |
| 1,884,759 A | 10/1932 | Hodny |
| 1,908,767 A | 5/1933 | Hodny |
| D92,937 S | 7/1934 | Vail |
| 2,060,401 A | 11/1936 | Smith |
| 2,166,303 A | 7/1939 | Hodny et al. |
| 2,180,610 A | 11/1939 | Ritz-Woller |
| 2,190,123 A | 2/1940 | Pace |
| 2,263,382 A | 11/1941 | Gotzinger |
| 2,561,582 A | 7/1951 | Marbel |
| 2,580,014 A | 12/1951 | Gazda |
| 2,595,331 A | 5/1952 | Calihan et al. |
| 3,040,207 A | 6/1962 | Grontkowski |
| 3,266,016 A | 8/1966 | Maruyama et al. |
| 3,317,906 A | 5/1967 | Baldridge |
| 3,436,758 A | 4/1969 | Kluth |
| 3,532,871 A | 10/1970 | Shipman |
| 3,543,018 A | 11/1970 | Barcus et al. |
| 3,574,283 A | 4/1971 | Albers |

(List continued on next page.)

FOREIGN PATENT DOCUMENTS

| AU | 415830 | 3/1968 |
|---|---|---|
| DE | 2359285 | 5/1974 |
| EP | 1032209 | 8/2000 |
| EP | 1033693 | 9/2000 |
| GB | 1440570 | 6/1976 |

OTHER PUBLICATIONS

U.S. patent application No. 09/731,574, Dec. 7, 2000, corresponding to German Application No. DE 10036875.1, Jul. 28, 2000.
U.S. patent application No. 09/731,575, Dec. 7, 2000, corresponding to German Application No. DE 10036875.1, Jul. 28, 2000 and German Application No. DE 20017165.8, Oct. 6, 2000.
U.S. patent application No. 09/303,503, Apr. 30, 1999, corresponding to German Application No. DE 19903595.4, Jan. 29, 1999.
U.S. patent application No. 09/304,002, Apr. 30, 1999, corresponding to German Application No. DE 19902486.3, Jan. 22, 1999.

*Primary Examiner*—Donnie L. Crosland
(74) *Attorney, Agent, or Firm*—Dority & Manning, P.A.

(57) ABSTRACT

A rearview mirror assembly having a mirror, an imaging device and a monitor is provided for a vehicle. The monitor and the mirror may be integrated in the housing to provide the driver of the vehicle with at least two fields of view simultaneously.

18 Claims, 6 Drawing Sheets

U.S. PATENT DOCUMENTS

| | | |
|---|---|---|
| 3,665,392 A | 5/1972 | Annas |
| 3,840,851 A | 10/1974 | Fowler et al. |
| 4,005,928 A | 2/1977 | Kmetz et al. |
| 4,023,029 A | 5/1977 | Fischer |
| 4,040,726 A | 8/1977 | Paca |
| 4,066,332 A | 1/1978 | Kato et al. |
| 4,109,235 A | 8/1978 | Bouthors |
| 4,167,113 A | 9/1979 | Mann |
| 4,274,078 A | 6/1981 | Isobe et al. |
| 4,299,444 A | 11/1981 | Römer |
| 4,443,057 A | 4/1984 | Bauer et al. |
| 4,463,411 A | 7/1984 | Proctor |
| 4,475,100 A | 10/1984 | Duh |
| 4,479,172 A | 10/1984 | Connor |
| 4,491,390 A | 1/1985 | Tong-Shen |
| 4,499,451 A | 2/1985 | Suzuki et al. |
| 4,506,315 A | 3/1985 | Maekawa et al. |
| 4,516,197 A | 5/1985 | Yonkers |
| 4,583,155 A | 4/1986 | Hart |
| 4,588,267 A | 5/1986 | Pastore |
| 4,591,954 A | 5/1986 | Kawamura et al. |
| 4,603,946 A | 8/1986 | Kato et al. |
| 4,613,791 A | 9/1986 | Kurihara et al. |
| 4,623,222 A | 11/1986 | Itoh et al. |
| 4,626,967 A | 12/1986 | Segoshi |
| 4,630,904 A | 12/1986 | Pastore |
| 4,645,970 A | 2/1987 | Murphy |
| 4,646,210 A | 2/1987 | Skogler et al. |
| 4,659,967 A | 4/1987 | Dahl |
| D289,989 S | 5/1987 | Skogler et al. |
| 4,663,869 A | 5/1987 | Nakagawa |
| 4,665,321 A | 5/1987 | Chang et al. |
| 4,701,022 A | 10/1987 | Jacob |
| RE32,576 E | 1/1988 | Pastore |
| 4,733,335 A | 3/1988 | Serizawa et al. |
| 4,733,336 A | 3/1988 | Skogler et al. |
| 4,791,534 A | 12/1988 | Lindberg |
| 4,793,690 A | 12/1988 | Gahan et al. |
| 4,799,768 A | 1/1989 | Gahan |
| 4,807,096 A | 2/1989 | Skogler et al. |
| 4,841,198 A | 6/1989 | Wilhelm |
| 4,862,330 A | 8/1989 | Machida et al. |
| 4,868,459 A | 9/1989 | Dennerlein et al. |
| 4,868,719 A | 9/1989 | Kouchi et al. |
| 4,882,565 A | 11/1989 | Gallmeyer |
| 4,886,960 A | 12/1989 | Molyneux et al. |
| 4,893,063 A | 1/1990 | Pernyeszi |
| 4,916,430 A | 4/1990 | Vu et al. |
| 4,917,477 A | 4/1990 | Bechtel et al. |
| 4,929,866 A | 5/1990 | Murata et al. |
| 4,935,665 A | 6/1990 | Murata |
| 4,951,179 A | 8/1990 | Machida |
| 5,014,167 A | 5/1991 | Roberts |
| 5,029,060 A | 7/1991 | Aho et al. |
| 5,050,051 A | 9/1991 | Machida et al. |
| 5,059,015 A | 10/1991 | Tran |
| 5,072,340 A | 12/1991 | Jones |
| 5,093,768 A | 3/1992 | Ohe |
| 5,097,395 A | 3/1992 | Aho et al. |
| 5,150,966 A | 9/1992 | Nelson |
| 5,165,772 A | 11/1992 | Wu |
| 5,174,649 A | 12/1992 | Alston |
| 5,207,492 A | 5/1993 | Roberts |
| 5,211,466 A | 5/1993 | Jarocki et al. |
| 5,241,457 A | 8/1993 | Sasajima et al. |
| 5,253,109 A * | 10/1993 | O'Farrell et al. ........... 359/604 |
| 5,272,602 A | 12/1993 | Sasajima et al. |
| 5,289,321 A | 2/1994 | Secor |
| 5,303,130 A | 4/1994 | Wei et al. |
| 5,355,284 A | 10/1994 | Roberts |
| 5,361,190 A | 11/1994 | Roberts et al. |
| 5,371,659 A | 12/1994 | Pastrick et al. |
| 5,388,035 A | 2/1995 | Bodem, Jr. |
| 5,404,869 A | 4/1995 | Parkyn, Jr. et al. |
| 5,436,741 A | 7/1995 | Crandall |
| 5,436,809 A | 7/1995 | Brassier et al. |
| 5,438,487 A | 8/1995 | Schmid et al. |
| 5,481,409 A | 1/1996 | Roberts |
| 5,497,305 A | 3/1996 | Pastrick et al. |
| 5,497,306 A | 3/1996 | Pastrick |
| 5,523,811 A | 6/1996 | Wada et al. |
| 5,528,422 A | 6/1996 | Roberts |
| 5,530,240 A | 6/1996 | Larson et al. |
| 5,574,443 A | 11/1996 | Hsieh |
| 5,587,699 A | 12/1996 | Faloon et al. |
| 5,788,357 A | 8/1998 | Muth et al. |
| 5,793,420 A | 8/1998 | Schmidt |
| 5,879,074 A | 3/1999 | Pastrick |
| 5,910,854 A | 6/1999 | Varaprasad et al. |
| 5,940,120 A | 8/1999 | Frankhouse et al. |
| 5,956,181 A * | 9/1999 | Lin ........................... 359/630 |
| 6,045,243 A | 4/2000 | Muth et al. |

* cited by examiner

REARVIEW MIRROR ASSEMBLY WITH MONITOR

FIELD OF THE INVENTION

The invention concerns a rearview mirror for vehicles, in particular, for commercial vehicles in which the mirror possesses an optical imaging apparatus.

BACKGROUND OF THE INVENTION

U.S. Pat. No. 4,882,565 discloses a rearview mirror for vehicles in which an indicator device is integrated in the reflecting surface. The indicator device is provided with light from an illumination element located behind the mirror surface. With this device, simple warning signals or stylized presentations of various functional units can be presented and brought to the rearview mirror for attention. The images produced by a camera are not presented here.

Upon making a turn with a vehicle from a subordinate street into a main thoroughfare, normally the driver makes use of the rearview mirror before he turns. In the case of a right turn, he has not only the right side mirror with the visible rearward area but also the view to the right-front over the mirror in his field of sight. To be aware of risks or traffic on the left side, he must turn his head and if necessary, use the left rearview mirror. In heavy traffic, therefore, he is obliged to change both his direction of vision and the position of his head. Thus, while he is looking to one side, the other side is not being tended to. This can lead to dangerous situations.

SUMMARY OF THE INVENTION

The present invention develops a rearview mirror with an optical imaging device of such a nature that the disparate areas surrounding the vehicle will come to the attention of the driver.

The achievement of this objective is accomplished by the features of this invention.

By means of the provision of a monitor, which is placed in the rearview mirror, an image produced by an imaging device such as a camera can be transmitted to the monitor. The camera can be directed to a field of view, which is not in the view angle of the driver when he looks into the mirror. With the advantage of the invention, the driver in one glance can not only discern the area directly in the reflected angle of the mirror as well as the area in front of the mirror, but he can also see another area on the monitor in the mirror without needing to change his direction of view nor to turn his head. In the case of the monitor, advantageously a Liquid Crystal Display (LCD) image is employed. Likewise, the camera would advantageously be a charge-coupled device (CCD) camera.

In accord with an advantageous embodiment of the invention, the monitor is placed in the edge area of the mirror, that is, the mirror pane, in order not to interfere with the fundamental purpose of the mirror. This makes it possible that the monitor need not be integrated into the mirror pane but rather can be placed in a position under, beside or above the mirror pane. The placement of the monitor would be effected by an appropriate recess in the mirror housing.

In accord with another advantageous embodiment of the invention, the camera is likewise installed within the mirror housing, whereby the incident light on the camera is made possible by a corresponding opening in the mirror housing.

In accord with yet another advantageous embodiment of the invention, the camera is designed to be pivoted, thus increasing its field of regard so that different areas, i.e., fields of view about the vehicle can be brought into view and depicted in the monitor. When backing up is a necessity, then the zone behind the vehicle can be seen in the monitor.

In accord with another advantageous embodiment of the invention, a plurality of cameras is provided. With this multi-camera arrangement, switching among the individual cameras again allows various areas around the vehicle to be presented in the monitor.

If this latter plan is followed, then the pivoting of the camera becomes redundant. The respective camera can be placed in an optimal position, e.g., laterally, to scan the current area to be overseen. The camera for the backing up operation is logically to be installed on the back side of the vehicle.

If additionally a plurality of monitors are available, then under certain circumstances, selective switching from camera to camera becomes unnecessary, since one camera each can be apportioned to one monitor. Additionally, the possibility exists that on various monitors and particularly in different areas of presentation, one monitor can show additional data such as temperature, speed, assured clear distance behind, to the front, or to the side. The different presentation areas of a monitor should be understood in the sense that on the monitor, different items can be selected by the driver and shown by means of an image within an image format.

In accord with a further advantageous embodiment, the rearview mirror can encompass a first and a second monitor. The first monitor is connected with a camera in one rearview mirror, and the second monitor is connected to a camera in the other side rearview mirror of a vehicle. Thus, this arrangement allows a greater area around the vehicle to be scanned at one glance.

By means of an image and data memory apparatus, what is essentially a "black-box" function is achieved. For this purpose, the continuous images of the last five minutes from one or more cameras can be retained in memory. Additionally, relevant data such as temperature, weather, time, and speed can also be saved. By these means, an accident can be more easily reconstructed.

In accord with another embodiment of the invention, the image recorded by a camera from the mirror housing is angled differently than that of the mirror surface. This is to prevent showing the same image in the monitor as is normally reflected in the mirror.

By means of a digital zoom, that is, by the digital selection and adjustable magnification provided by the zoom, a function and an image component similar to that obtained by the pivoting of a camera are possible.

In accord with another advantageous embodiment, the monitor is integrated into the mirror such that the surface of the monitor is unnoticeable, or scarcely visible when in a non-activated state. This allows the monitor surface to be provided with a partial-reflecting means. Alternately, if the monitor is placed behind the mirror pane, then the area of the mirror pane, behind which the monitor is found, can be likewise be only partially or "half-silvered" with reflecting means. For example, the reflective coating of the mirror pane in an area in front of the monitor is provided with distanced openings in order to obtain a locally higher transparency of the mirror pane. This interruption of the reflecting layer can be, for instance, in the form of thin stripes, relatively parallel to one another. Alternatively, the reflecting coating may be applied in the form of small, individual dots; i.e., stippled. If the reflective area is thus partially opened in such a manner, then the rearview potential of the rearview mirror is only limited by a small degree. Nevertheless, a high degree of local transparency of the mirror pane is gained, so that the monitor, in its activated condition, is visible, although in the non-activated condition, is practically invisible. This reduction of the areal density (i.e., reduced distribution pattern) of the reflective layer can, for instance, be executed by a laser, an etching or inscribing process, or by appropriate masking when the coating is applied to the mirror pane.

BRIEF DESCRIPTION OF THE DRAWINGS

Further details, features and advantages of the invention can be inferred from the following description of preferred embodiments with the help of the drawings. There is shown in.

DETAILED DESCRIPTION OF THE INVENTION

Figure 1:
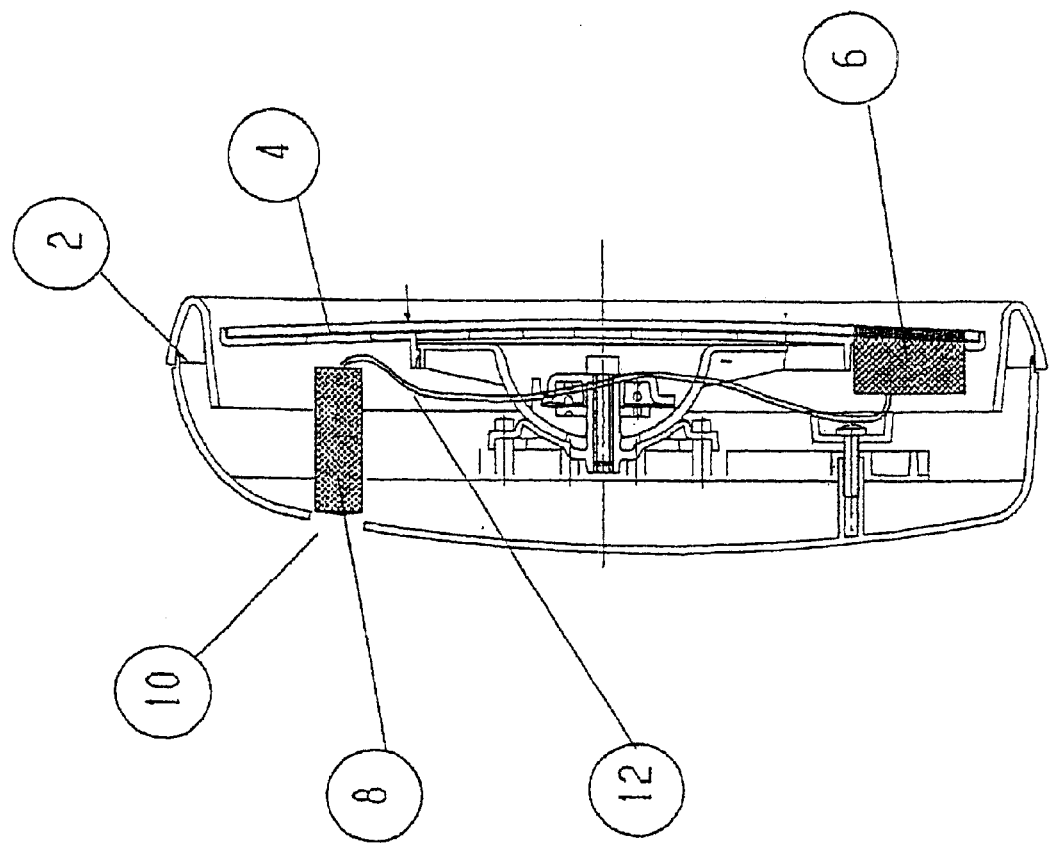
FIG. 1 a sectional view of a first embodiment of the invention.

Reference will now be made in detail to the presently preferred embodiments of the present invention, examples of which are illustrated in the drawings. The examples are provided by way of explanation of the invention and are not meant as limitations of the invention. For example, features illustrated or described as part of one embodiment can be used on another embodiment to yield yet a third embodiment. Accordingly, it is intended that the present invention include such modifications and variations.

Figure 2:
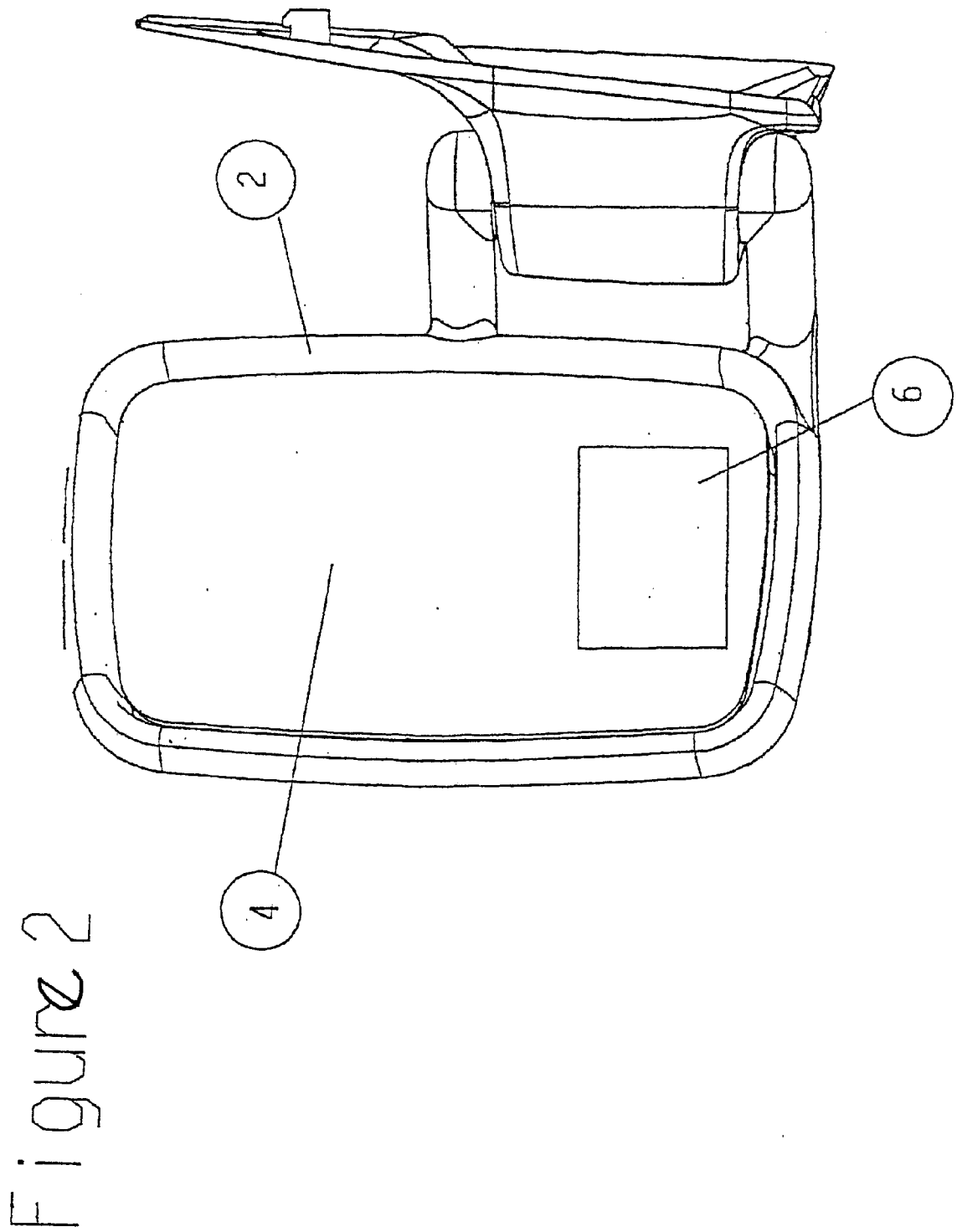
FIG. 2 a front view of a mirror in accord with the first embodiment.

In FIGS. 1 and 2, a first embodiment of an invented rearview mirror is shown. The rearview mirror comprises a mirror housing 2, a mirror pane 4 which is adjustably placed in the mirror housing 2, and an optical imaging apparatus 6, which is integrated into the mirror surface in the form of a monitor 6. Likewise, included in the mirror housing 2 is a camera 8, preferably a CCD-Camera, which opens through an aperture 10 looking forward in the direction of travel. The monitor 6 is connected to the camera 8 by means of a cable 12. In this way, the camera 8 in the mirror housing 2 of a left rearview mirror is adjusted advantageously at an angle forward and to the right. Thus, an area is brought into view, which otherwise would not be in the visible sector, when the driver looks in the left rearview mirror.

The monitor 6 is integrated into the mirror pane 4 as an LCD-display. The surface of the LCD-display is only half silvered, so that the monitor 6 is nearly invisible when the LCD-display is inactive. Alternately, the monitor 6 can be placed behind the mirror pane 4, in which case the pane 4 is half silvered in the area of the monitor 6, so that the display of the monitor 6 in its activated state is visible, and in its inactivated state is not visible.

Figure 3:
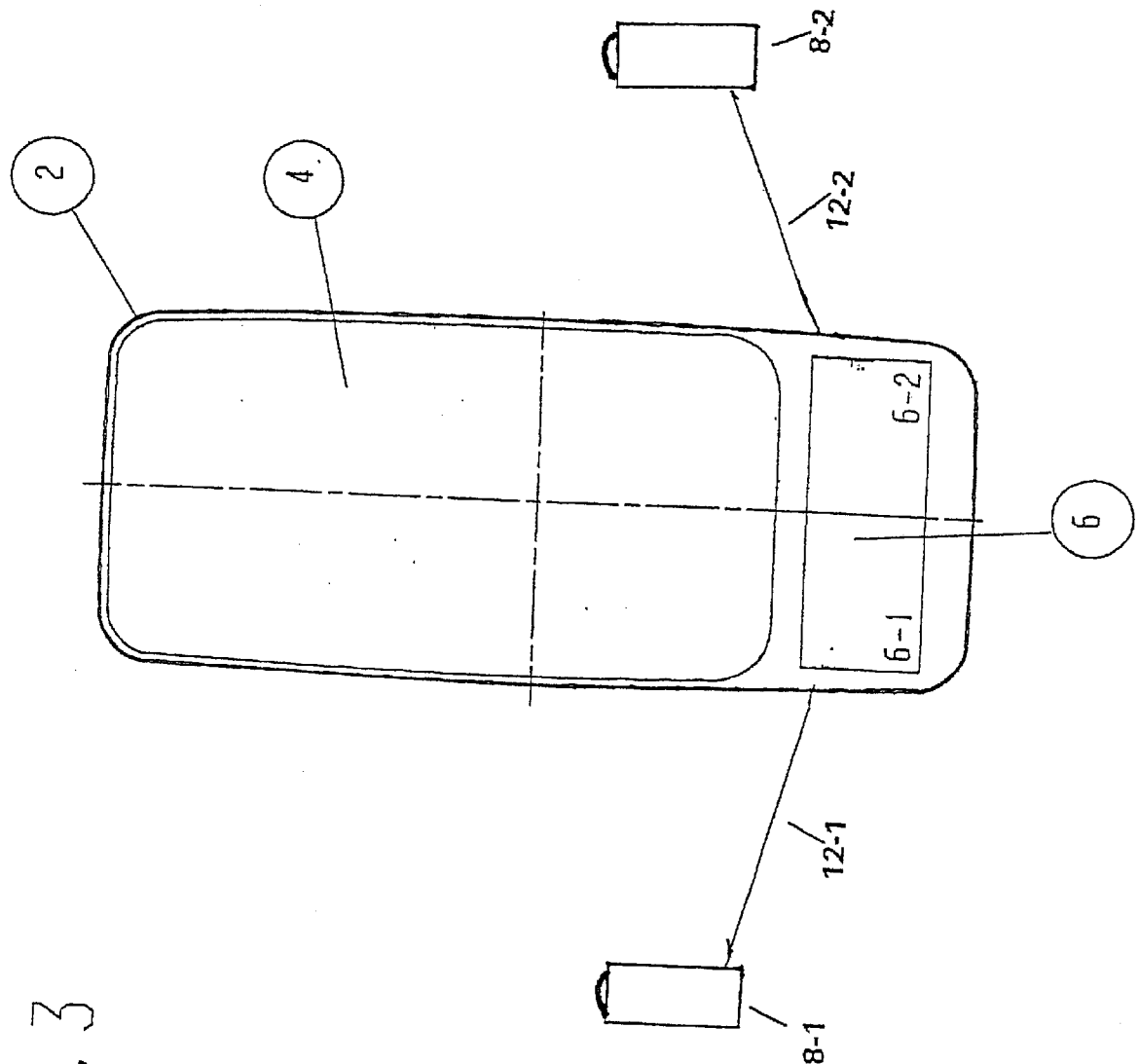
FIG. 3 a schematic presentation of a second embodiment of the invention.

FIG. 3 schematically depicts a second embodiment of the invention, which includes a first camera 8-1 and a second camera 8-2 as well as a monitor 6 that has a left view sector 6-1 and a right view sector 6-2. As indicated by the presence of cables 12-1 and 12-2, the first camera 8-1 images on the left presentation zone 6-1 and the second camera 8-2 images on the right presentation zone 6-2. Contrary to the first embodiment, the monitor is not integrated into the mirror pane 4, but rather placed thereunder in the mirror housing 2.

This first camera 8-1 governs a view to the left of the vehicle, as seen in the traveling direction, and brings the image to the left presentation area 6-1. The second camera 8-2 scans an area to the right of the vehicle and this image is brought to the right presentation area 6-2.

Figure 4:
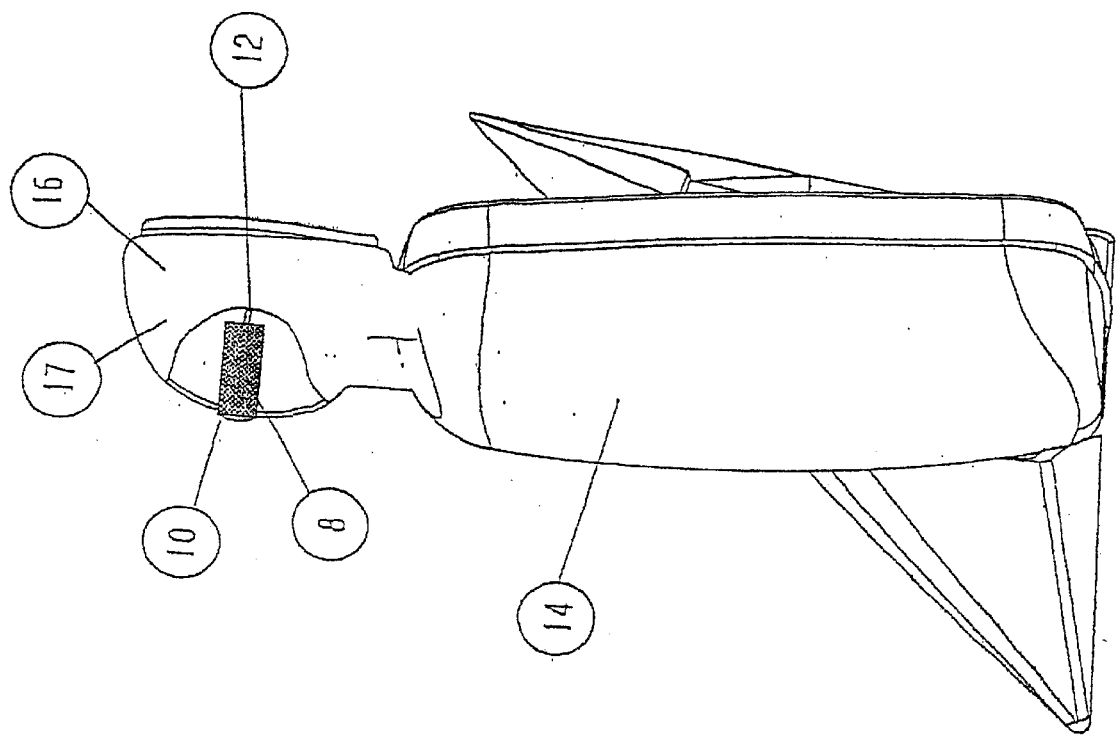
FIG. 4 a side view of a third embodiment of the invention.
Figure 5:
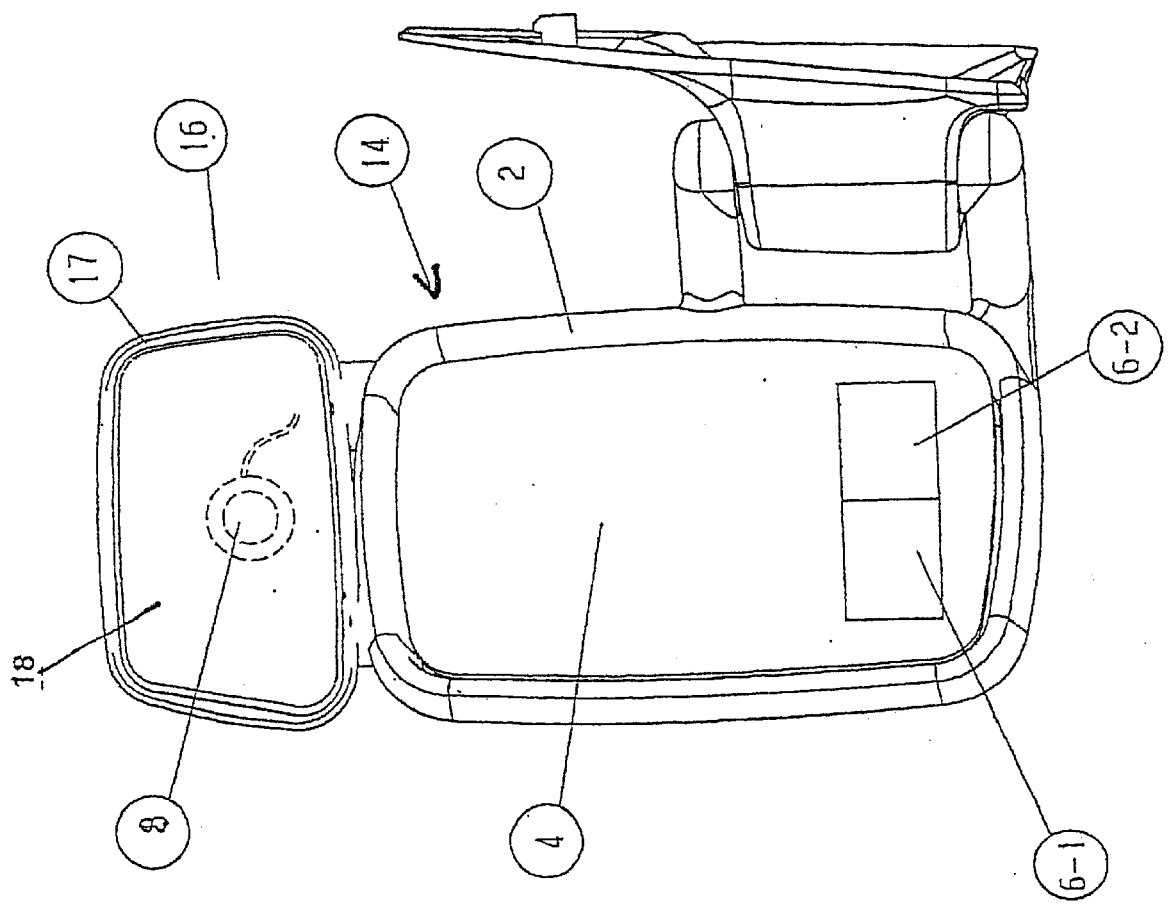
FIG. 5 a front view of the mirror in accord with the third embodiment.

FIGS. 4 and 5 illustrate a third embodiment of the invention in which a variant of the second embodiment is presented. The rearview mirror, in accord with the third embodiment, includes a main mirror 14 with a mirror pane 4 and an auxiliary mirror 16 superimposed on the main mirror 14, for which auxiliary mirror 16, an individual housing 17, and pane 18 are provided.

A first camera 8 is placed within the auxiliary mirror housing 17 of the left-side rearview mirror. Through an opening in auxiliary mirror housing 17, the view of first camera 8 is in the direction of travel. A second camera, not further described, is placed in the right-side rearview mirror. In the lower area of the mirror pane 4 of the main mirror 14 is provided a monitor 6 with left and right image presentation zones, 6-1 and 6-2, respectively. By means of a cable 12, the first camera is connected with the left presentation zone 6-1 and the second camera (not shown) is connected to the right presentation zone 6-2 in the rearview mirror to the left of the driver.

The placement of the monitor 6 is accomplished in the same manner as shown in the embodiment of FIGS. 1 and 2, so that the two presentation areas 6-1 and 6-2 of the monitor 6, likewise, are unseen in their inactivated state.

Figure 6:
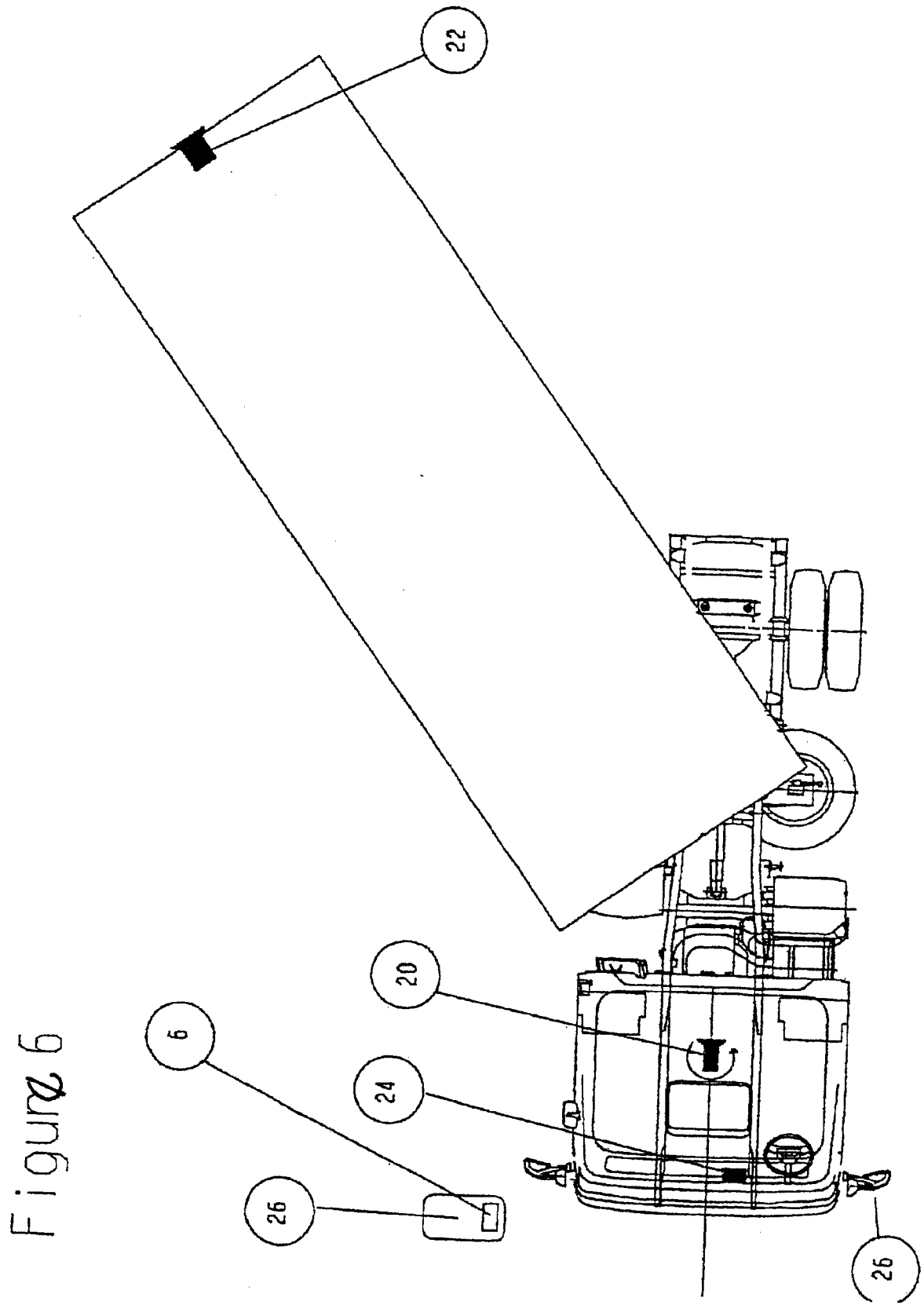
FIG. 6 a schematic presentation of a fourth embodiment of the invention.

FIG. 6 shows a fourth embodiment of the invention, with a forward facing, pivoting camera 20 located on the top side of the roof of a tractor and a camera 22 facing to the rear on the trailer of the tractor. In a left side, rearview mirror 26, a monitor 6 is placed, which allows, optionally by means of an operative device 24, connection to either the forward pivoting camera 20 or the rear camera 22. The pivoting camera 20 can be rotated by means of the operative apparatus 24, whereby the field of view of the camera 20 can widely varied.

When backing up is required, the image from the back viewing camera 22 can be switched to the monitor 6 by means of corresponding switching by the operating apparatus 24, the view of camera 22 is presented in the left rearview mirror 26. Accordingly, when needed, the driver can then, again with the operating apparatus 24, restore the viewing field of the forward camera 20 on the monitor 6.

The fourth embodiment, in accord with FIG. 6, may be modified so that, as in the case of the second and the third embodiments, two presentation zones or two monitors for the two cameras are provided.

It will be apparent to those skilled in the art that various modifications and variations can be made in the present invention without departing from the scope and spirit of the invention. It is intended that the present invention include such modifications and variations as come within the scope of the appended claims and their equivalents.

Claimed is:

1. A rearview mirror assembly for a vehicle comprising:
   a mirror housing for attachment to the vehicle;
   a mirror pane attached to the mirror housing and having
      a reflective coating, the mirror pane disposed in a field
      of view of a driver of the vehicle, the reflective coating having a reduced areal density on at least one area of the mirror pane; and a monitor attached to the mirror housing, the monitor having a reflective surface disposed proximate the reduced areal density on the at least one area of the mirror pane, the reduced areal density configured for viewing the monitor therethrough when the monitor is activated and the reduced areal density and the reflective surface cooperable to reflect images when the monitor is inactive.

2. The rearview mirror assembly of claim 1, wherein the monitor is configured to be selectively activated.

3. The rearview mirror assembly of claim 1, wherein the surface is substantially integrated in the mirror pane.

4. The rearview mirror assembly of claim 1, further comprising an imaging device configured to collect an image and data from a vehicle field of regard and wherein the surface defines at least one image plane, the imaging device in electrical communication with the monitor to thereby display the image and data on the at least one image plane.

5. The rearview mirror assembly of claim 4, wherein the reflective coating is a partial coating disposed on the at least one area of the mirror pane proximate the at least one image plane.

6. The rearview mirror assembly of claim 5, wherein the partial coating is a stippled coating defining interrupted areal integrity.

7. The rearview mirror assembly of claim 5, wherein the partial coating is a striped coating defining interrupted areal integrity.

8. The rearview mirror assembly of claim 4, wherein the at least one image plane defines an image differing from the mirror pane.

9. The rearview mirror assembly of claim 4, wherein the at least one image plane is substantially invisible when the monitor is inactive.

10. The rearview mirror assembly of claim 4, wherein the at least one image plane is visible when the monitor is activated.

11. A rearview mirror assembly for a vehicle having a camera device for imaging, the mirror assembly comprising:

a mirror housing for attachment to the vehicle;

a mirror pane attached to the mirror housing; and a monitor attached to the mirror housing in electrical communication with the camera device, the monitor having a surface and an image plane, the surface disposed proximate the mirror pane and having a reflecting coating defining interrupted areal integrity, the mirror pane and the reflecting coating cooperating to provide a reflection when the monitor is inactive.

12. The rearview mirror assembly of claim 11, wherein the surface is disposed adjacent the mirror pane.

13. The rearview mirror assembly of claim 11, wherein the image plane is visible when the monitor is active.

14. A rearview mirror assembly for a vehicle, the rearview mirror assembly comprising:

a mirror housing configured for attachment to the vehicle;

at least one camera configured to record at least one image from at least one vehicle field of regard, the at least one camera disposed apart from the mirror housing;

at least one other camera configured to record at least one other image from at least one other vehicle field of regard;

a monitor having a reflective coating with a reduced areal density and at least one image plane configured to selectively display the at least one image and the at least one other image via the reduced areal density, the monitor attached to the mirror housing such that the monitor is disposed in a field of view of a driver of the vehicle; and a mirror pane configured to reflect a rearview image, the mirror pane attached to the mirror housing and disposed proximate the at least one image plane of the monitor and the field of view of the driver, the mirror pane configured to present the rearview image at an angle differing from the at least one image and the at least one other image, wherein the mirror pane further includes means for interrupting areal density such that the at least one image plane is visible when the monitor is activated and not visible when the monitor is not activated.

15. The rearview mirror assembly of claim 14, wherein the housing defines an opening therethrough, the at least one other camera disposed in the housing proximate the opening and configured to capture the at least one other vehicle field of regard in a direction away from the rearview image.

16. The rearview mirror assembly of claim 14, wherein the at least one image plane includes at least two presentation areas such that a respective one of the at least one image and the at least one other image is displayed on a respective one of the at least two presentation areas.

17. The rearview mirror assembly of claim 14, wherein the means for interrupting areal density are substantially parallel lines of reflective coating in spaced apart relation to each other, the parallel lines disposed on the mirror pane proximate the at least one image plane.

18. The rearview mirror assembly of claim 14, wherein the means for interrupting areal density are dots of reflective coating in spaced apart relation to each other, the dots disposed on the mirror pane proximate the at least one image plane.

* * * * *